United States Patent [19]

Holm

[11] 4,381,605
[45] May 3, 1983

[54] SHEARING MACHINE HAVING ROTATABLE CUTTER WHEELS

[76] Inventor: Folke Holm, Hanogatan 7, S-150 13 Trosa, Sweden

[21] Appl. No.: 243,037

[22] Filed: Mar. 12, 1981

[30] Foreign Application Priority Data

Nov. 19, 1979 [SE] Sweden .............................. 7909535

[51] Int. Cl.³ .............................................. B23D 19/04
[52] U.S. Cl. ..................................... 30/240; 30/500; 83/102.1; 83/430; 83/500; 83/574
[58] Field of Search ................................. 30/205–207, 30/240, 292, 500; 83/102.1, 105, 430, 500–503, 574

[56] References Cited

U.S. PATENT DOCUMENTS

| | | | |
|---|---|---|---|
| 1,098,671 | 6/1914 | Lundy | 83/105 |
| 1,181,354 | 2/1916 | Stevens | 83/500 X |
| 1,210,148 | 12/1916 | Cesar | 83/430 |
| 2,946,251 | 7/1960 | Engel | 83/500 X |
| 3,126,780 | 3/1964 | Booth | 83/500 |
| 3,906,629 | 9/1975 | Fuchs, Jr. | 30/240 |
| 4,283,853 | 8/1981 | Fazzini | 30/292 X |

FOREIGN PATENT DOCUMENTS

| | | | |
|---|---|---|---|
| 148409 | 2/1904 | Fed. Rep. of Germany | 83/500 |
| 437896 | 2/1912 | France | 83/502 |
| 493169 | 4/1954 | Italy | 83/500 |
| 270732 | 9/1927 | United Kingdom | 83/500 |

*Primary Examiner*—James M. Meister
*Attorney, Agent, or Firm*—Murray Schaffer

[57] ABSTRACT

A shearing machine for shearing sheet material, comprises a body (1) and to co-operating shearing wheels (5, 6) between whose shearing edges (41, 42) the sheet is cut. The stand (1) comprises a first part (2) and a second part (3), which are laterally offset from one another, and an intermediate horizontal connecting part (4). The shearing wheels (5, 6) are axially offset from one another and have their shearing edges (41, 42) in tangential contact with one another. The intermediate horizontal stand part (4) forms a wedge-shaped deflector and has its leading edge (27) disposed in line with and at a distance from the nip (28) between the shearing wheels (5, 6). The shearing machine is free from structural elements on either side of the shearing wheels (5, 6), thus enabling sheet of any width to be cut.

2 Claims, 6 Drawing Figures

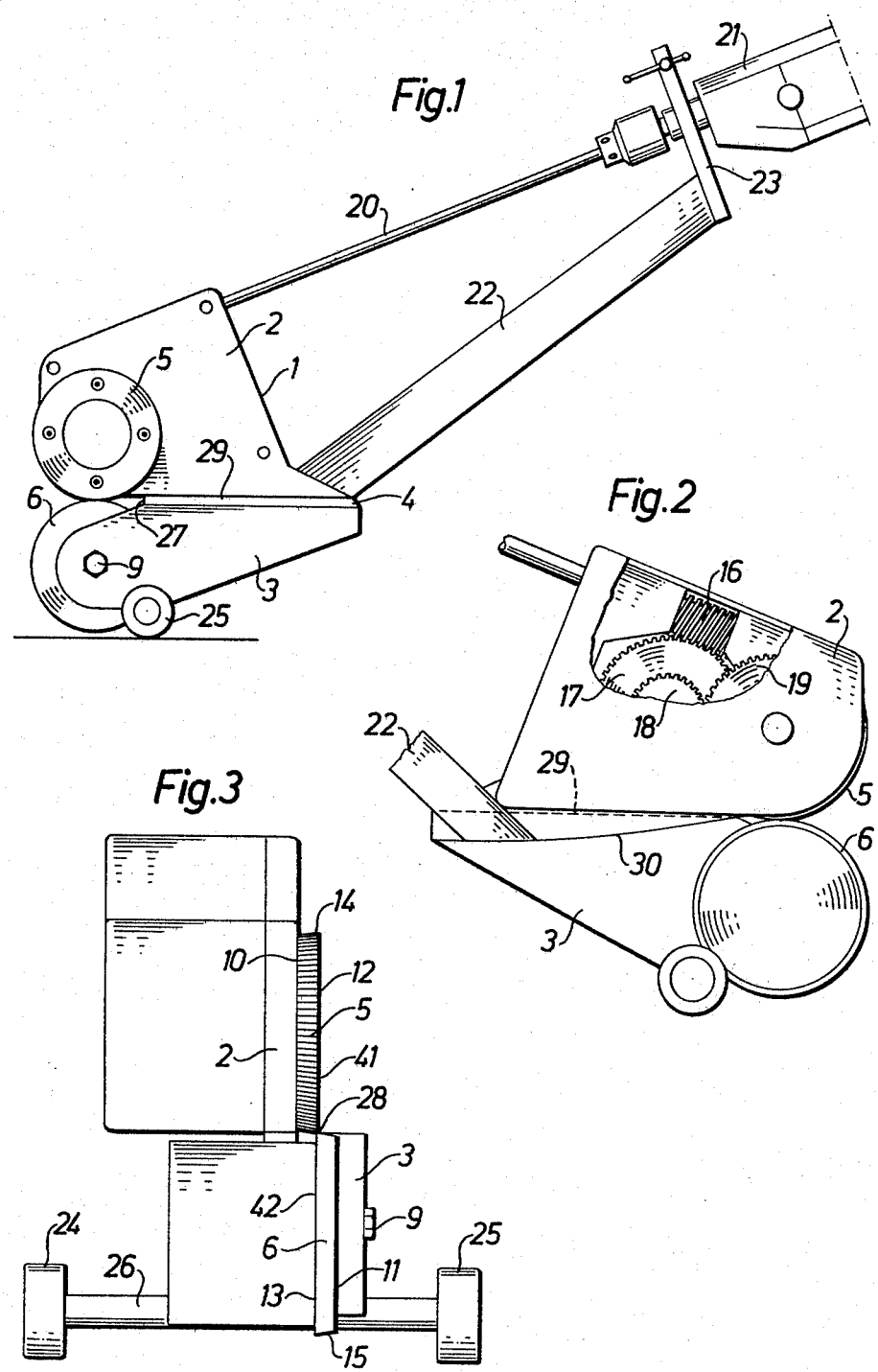

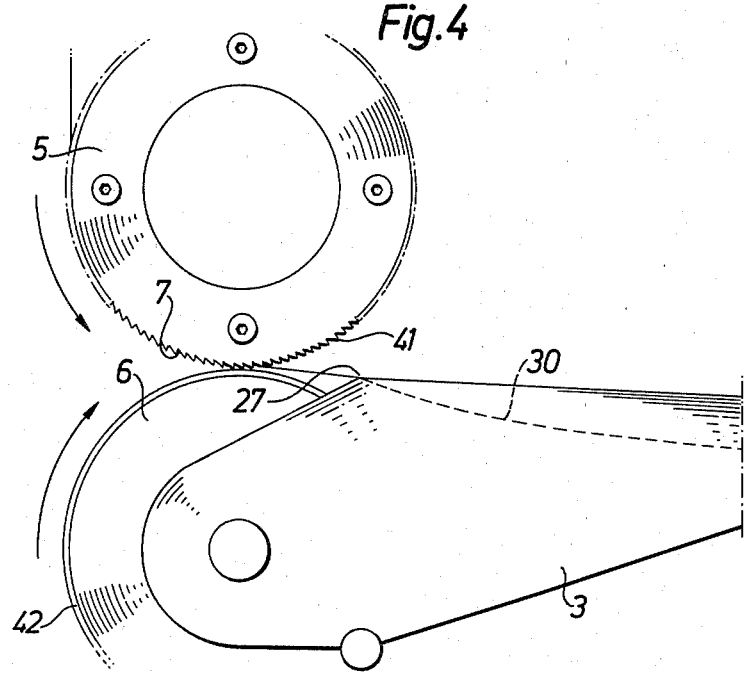
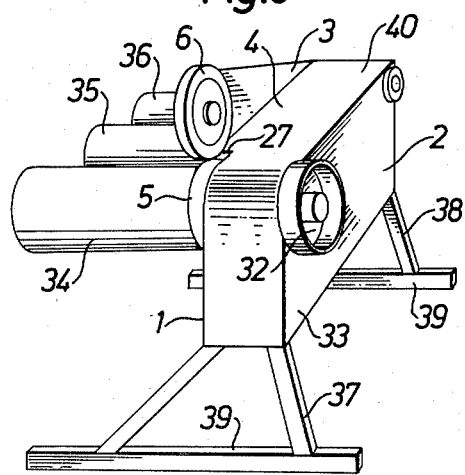
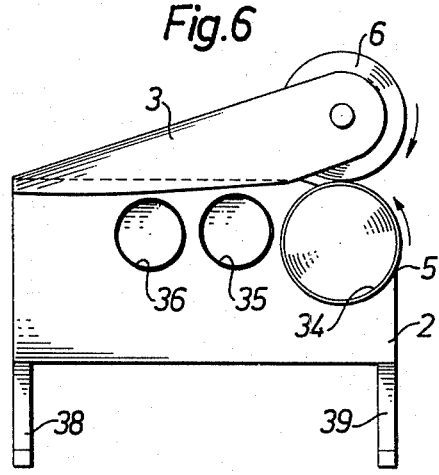

4,381,605

SHEARING MACHINE HAVING ROTATABLE CUTTER WHEELS

BACKGROUND OF THE INVENTION

This invention relates to a shearing machine for shearing or cutting both heavy-gauge sheet metal and thin sheet metal.

OBJECT OF THE INVENTION

This invention seeks to provide a shearing machine which can cut heavy-gauge sheet metal both in straight lines and in arcuate lines, in a simple and rapid manner and which can thus advantageously replace flame cutting. An advantage of such a shearing machine when compared with a flame cutter is that it enables sheet to be cut without destroying any hot hardening that has been imparted to the sheet and without any appreciable deformation or material accumulation occurring at the sheet cuts.

SUMMARY OF THE INVENTION

This invention provides a shearing machine for shearing sheet material, said machine comprising a support body having a first part and a second part, which are laterally offset from one another, and an intermediate horizontal part which connects the first and second parts and two cooperating shearing wheels between whose shearing edges the sheet is cut, one of the shearing wheels being toothed, driven and mounted in the first part of the body, the second shearing wheel being mounted in the other part of the body for free co-rotation, the shearing wheels being axially offset from one another and having their shearing edges in tangential contact with one another, the outer surfaces of the shearing wheels being bevelled and the larger side faces of the shearing wheels formed by the bevels being disposed in the same vertical plane at least with respect to the peripheral surface portions, said intermediate horizontal body part forming a wedge-shaped deflector having its leading edge disposed in line with and at a distance from the nip between the shearing wheels, said deflector having opposed side surfaces adapted each to guide a respective piece of the sheet after the sheet has been cut, and the shearing machine being free from structural elements on either side of the shearing wheels and the body at the level of the shearing wheel nip and the wedge-shaped deflector.

The bevel of the shearing wheels may be about 5°. The machine may be adapted to be driven by a pneumatic or electric hand drill releasably connectable to the machine, by means of a mounting on the shearing machine.

The machine may be adapted to be moved and guided manually, being provided with wheels or the like, although alternatively the machine may be adapted to be stationary.

BRIEF DESCRIPTION OF THE DRAWINGS

FIG. 1 is a side elevational view of one embodiment of a shearing machine according to the invention;

FIG. 2 is a part of the shearing machine of FIG. 1 seen from the opposite side with certain parts cut away;

FIG. 3 shows the shearing machine of FIG. 1 in end elevation;

FIG. 4 shows part of the shearing wheels in the shearing machine of FIG. 1;

FIG. 5 is a perspective view of a shearing unit according to the invention in the form of a stationary construction; and FIG. 6 is a side elevational view of the shearing machine of FIG. 5.

DESCRIPTION OF PREFERRED EMBODIMENTS

FIGS. 1 to 3 shows a shearing machine according to the invention comprising a body 1 which in turn comprises a first vertical part 2, which is at the top in the example illustrated, and a second vertical part 3 (at the bottom in the example illustrated), with an intermediate horizontal part 4. The top and bottom parts of the body are laterally offset from one another. The body is made in one piece, e.g. by casting or by welding together the said three parts to provide a stable structure.

The shearing machine also comprises shearing members consisting of two wheels which co-operate with one another, i.e. a driven shearing wheel 5 and a freely rotating or co-rotating shearing wheel 6, the wheels each being situated in their own vertical planes and being in offset parallel relationship to one another. The driven shearing wheel 5 is toothed, the edges of the teeth 7 extending in the direction of rotation as shown by an arrow in FIG. 4. The driven wheel 5 is disposed on an axle 8 mounted rotatably in the top part 2 of the body. The freely rotating wheel 6 is mounted rotatably on an axle 9 rigidly secured in the bottom part 3 of the body. Alternatively, the latter axle can be mounted rotatably in the bottom part, the shearing wheel being secured to the axle. The axles are parallel and situated at a predetermined distance from one another depending on the diameter of the shearing wheels 5, 6, and the axles are stub axles, i.e. they have a fixed mounting both axially and radially. The construction of the body as a single stable member facilitates this fixing of the axles. The position of the bottom axle can be adjusted radially relative to the first axle to compensate for any loss of material occurring, during grinding, at the edges of the shearing members.

Each shearing wheel has an inside face, 10 and 11 respectively, facing the corresponding body part 2 and 3 respectively, and an outside face 12 and 13 respectively, and a radially outer surface 14 and 15 respectively. The outside faces 12 and 13 each have a larger diameter than the corresponding inside faces 10 and 11 respectively, so that the radially outer surfaces each have a bevel which is preferably 5° or thereabouts. The peripheral corner between the radially outer surface and the outside of each shearing wheel forms a peripheral shearing edge 41, 42 which, because of the said bevel, has an angle of less than 90°, and which is preferably therefore 85° or thereabouts. To achieve effective cutting, the shearing edges 41, 42 must touch one another, at a nip, and this means that the outside faces 12, 13 of the shearing wheels, or at least the peripheral outer parts thereof, should be the same plane. The shearing nip formed by the shearing wheels thus has no intermediate gap. The shearing wheels are thus single shearing, and this means that a single cutting groove or shearing cut is formed continuously when a sheet passes through the shearing wheel nip and no cuttings are therefore formed.

The intermediate horizontal part 4 of the body also has the function (in addition to being a connector) of acting as a deflector and for this purpose it is constructed in the form of a wedge, the leading edge 27 of which is situated in line with the nip of the shearing wheels 5, 6, at right angles to the direction of sheet feed and at a distance from, i.e. somewhat after, the nip 28 between the wheels. The wedge-shaped deflector has a top supporting surface 29 and a bottom supporting surface 30 (or a first supporting surface 29 and a second supporting surface 30), the top surface 29 advantageously being coplanar with the shearing wheel nip or contact point so that the piece of sheet separated on the right (with reference to FIG. 3) will be taken up on the top supporting surface 29 of the deflector while the left-hand piece of sheet will be guided beneath the deflector and guided by its bottom supporting surface 30.

The top shearing wheel is driven via a reduction gear comprising a combination of a worm 16 and a gearing comprising three gearwheels 17, 18, 19 mounted in the top part 2 of the body 1. The worm and the gearing are protected by a cover secured to the body 1. The worm is connected to or formed on a drive shaft 20 extending rearwardly from the body to connect with the chuck of a conventional hand drill 21, e.g. of a power of 450 W, as the power source, and this has proved adequate for cutting 4 mm sheets. A bar 22 is secured to the body 1 and extends rearwardly therefrom. The rear end of the bar is provided with a mounting 23 to support and secure the power source 21, which may be pneumatically or electrically driven.

The shearing machine also comprises two support wheels 24, 25 mounted on a shaft 26 fixed to the bottom part of the body. The wheeled shearing machine is thus readily mobile and can be easily manoeuvred by the operator to a convenient working position before or during the shearing operation.

The power source is advantageously controlled by a control of the steplessly adjustable type so that the sheet can be sheared at a controlled speed according to individual conditions. The sheet feed through the nip thus depends on the speed of the driven shearing wheel 5.

A cylindrical support 31 is provided on the axle 9 of the bottom shearing wheel 6 and is adjacent the outside face of the wheel 16. The support 31 bears the left-hand piece of sheet during cutting as viewed in the direction of sheet feed.

A shearing machine in accordance with the invention can also be constructed for shearing on a bench or the like, i.e. at a normal working height, in which case the driving shaft 20 is shortened and the bar 22 is removed from the above-described embodiment and the mounting for the power source is combined directly with the body to enable the releasable connection of the power source to the worm shaft.

FIGS. 5 and 6 show an alternative embodiment of a shearing machine in accordance with the invention for stationary use. The essential structural elements of the shearing machine for performing the shearing operation are the same as in the previously described embodiment and therefore have the same references. However, the shearing machine is inverted in relation to the previously described construction, so that the toothed and driven shearing wheel 5 is situated below the freely rotating shearing wheel 6, although they both co-operate as described previously. A belt engaging wheel 32 is provided at the bottom part 33 of the body for connection to an electric motor via a belt, the shearing wheel 5 being driven via a reduction gear as described previously. A cylindrical support 34 is provided on the shaft of the driven shearing wheel to support the right-hand piece of sheet as considered in the direction of sheet feed. Another two such supports 35, 36 are provided on the first part of the body after the said cylindrical support 34 in the direction sheet feed. The shearing machine is supported by two pairs of legs 37, 38 inter-connected by cross-members 39, by means of which the machine can be mounted on a suitable foundation.

The intermediate part 4 of the body has the same location and function as in the first-described embodiment. The top of the first part of the body is constructed as a plane supporting surface 40 which merges into the top supporting surface of the wedge-shaped deflector 4.

In both the embodiments described above, the construction proposed does not result in any components which restrict operation located at the sides of the shearing machine level with the nip 28 of the shearing wheels 5, 6 and the deflector wedge 4.

On either side of the shearing nip and the deflector wedge, in the direction extending from and at a level with the nip and the deflector wedge respectively, the shearing machine is completely free of any structural element which might obstruct the relative movement of the sheet or the shearing machine. This means that the sheet to be sheared may have any desired width and the cut can be made to an arc, even an arc having a very small radius. It is to be appreciated also that there is not any obstructive component at the said level in the direction of relative movement of the sheet after the cut has been made, i.e. behind the nip of the shearing machine.

A preferred embodiment of a shearing machine described above surprisingly enables heavy-gauge sheet of any material to be cut. Sheet of virtually any desired gauge can be cut by appropriate dimensioning of the shearing wheels and power source. The edges of the cut continue to be clean and even require no subsequent machining, unlike the edges obtained in flame cutting, which additionally destroys the hot hardening of the sheets.

The actual shearing operation is virtually silent and smooth with very good control of the shearing line at the speed that is considered appropriate, particularly if a steplessly adjustable speed control is used. Large sheets can be cut and there is no difficulty in cutting long even curves after the sheet has been placed on the supports at the nip height. An important advantage of the preferred embodiment is that a conventional drill machine can be used as the power source and can be rapidly and easily connected to the shearing machine as illustrated and described hereinabove with reference to FIGS. 1 to 4.

Although particular embodiments of the invention have been described and illustrated herein, it is recognised that modifications may readily occur to these skilled in the art and consequently it is intended that the following claims be interpreted to cover such modifications and equivalents.

What is claimed is:

1. A shearing machine for cutting sheet metal of varying thickness comprising a supporting body having an upper and lower portion, at least one pair of rollers freely journalled on a shaft fixed to the lower portion of said body and a handle means for manually guiding said body about on said rollers, a freely rotatable cutter wheel having a planar edge mounted about a horizontal axis in the lower portion of said body, a driven cutting wheel having a serrated peripheral edge mounted in the upper portion of said body for rotation about an axis parallel to the axis of said freely rotatable cutting wheel, the peripheral edges of said cutting wheels being bevelled, said wheels being arranged offset axially with respect to each other so that the large side faces formed by said bevels are disposed in the same vertical plane and in tangential contact with each other to co-rotate, said body having means for removably mounting an electric hand motor for driving said driven cutting wheel.

2. The shearing machine according to claim 1, wherein the bevel of said cutting wheels is about 5°.

* * * * *